J. C. TERRILL.
Combined Plant-Setter and Seed-Planter.
No. 196,840. Patented Nov. 6, 1877.
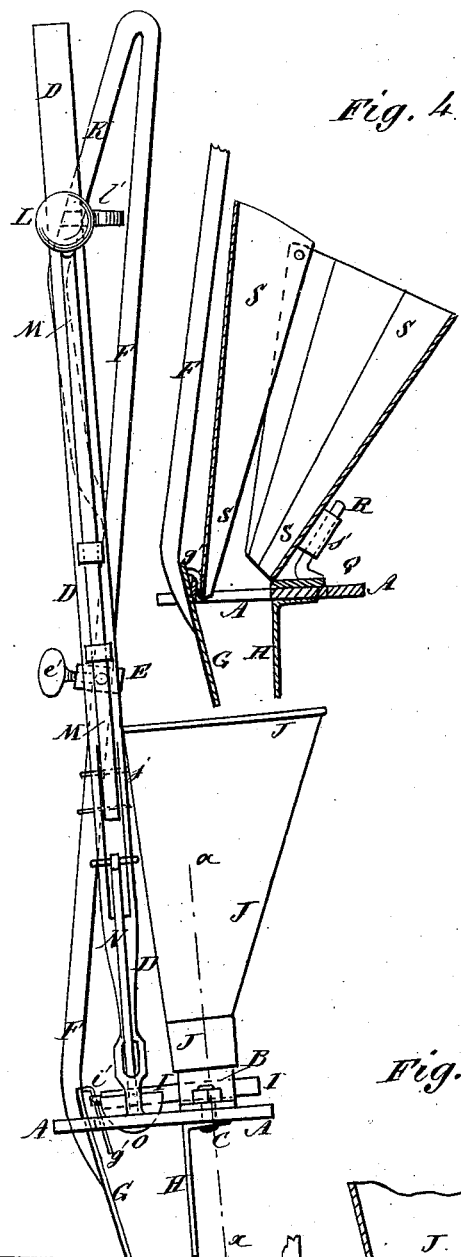
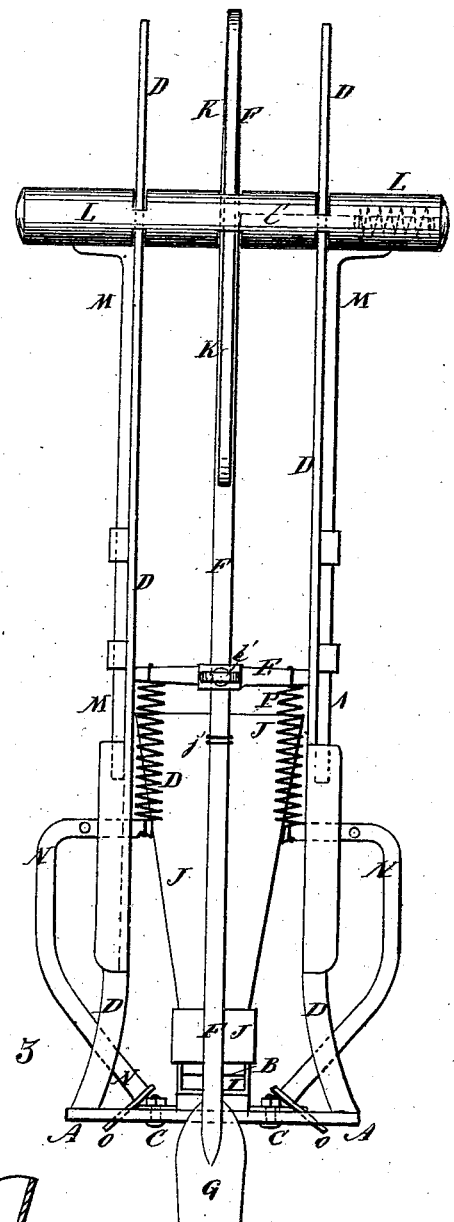

UNITED STATES PATENT OFFICE.

JOSHUA C. TERRILL, OF OWENSBOROUGH, KENTUCKY.

IMPROVEMENT IN COMBINED PLANT-SETTER AND SEED-PLANTER.

Specification forming part of Letters Patent No. 196,840, dated November 6, 1877; application filed August 11, 1877.

*To all whom it may concern:*

Be it known that I, JOSHUA C. TERRILL, of Owensborough, in the county of Daviess and State of Kentucky, have invented a new and useful Improvement in Combined Plant-Setter and Seed-Planter, of which the following is a specification:

Figure 1 is a side view of my improved machine arranged as a seed-planter. Fig. 2 is a rear view of the same. Fig. 3 is a detail sectional view of the same, taken through the line $xx$, Fig. 1. Fig. 4 is a detail section of the same arranged as a plant-setter.

Similar letters of reference indicate corresponding parts.

The object of this invention is to improve the construction of the plant-setter for which Letters Patent No. 186,698 were granted to C. J. and H. W. Williams, January 30, 1877, so as to adapt it to be used also as a planter for planting corn and other seed rapidly and accurately.

The invention consists in the combination of the box and bolts, the hopper, and the dropping-slide with the bed-plate, the oscillating rod, and the operating mechanism of the machine.

A is the base-plate of the machine, the central part of which and the middle part of its rear bar are cut away. Upon the middle part of the front bar of the plate A is placed a small box, B, which has lugs formed upon the lower part of its sides to receive the bolts C, by which it is secured in place detachably. To the end bars of the base-plate A are attached the lower ends of two bars, D, to the middle parts of which are pivoted the ends of a cross-rod, E. Through a hole in the center of the cross-rod E passes a rod, F, which is secured in place adjustably by a set-screw, $e'$. To the lower end of the rod F is attached a shovel or plate, G, which, in connection with the stationary shovel H, attached to the front bar of the plate A, opens the hole to receive the seed. To the rod F, or to the upper part of the shovel G, is attached a hook, $g'$, to hook into an eye, $i'$, formed upon the rear end of the dropping-slide I, which works back and forth upon the front bar of the plate A, through holes in the front and rear sides of the box B, and has a hole formed in it to receive the seed, carry it out, and drop it to the ground.

When more or less seed is to be dropped for a hill, the slide I is exchanged for one having a larger or smaller hole.

J is the seed-hopper, the lower end of which is so formed as to fit upon the box B, and which is held in place by the spring-hooks $j'$, attached to it, and which hook around the rod F or the cross-rod E. The upper part of the rod F is bent back upon itself into angular form, or has an angular or double-inclined rod, K, attached to it, which passes through a hole in the center of the cross-bar L, so that the rod F may be vibrated to operate the shovel G by the upward and downward movement of the said cross-bar L. The cross-bar L has holes formed through its end parts to receive the upper ends of the bars D, upon which it slides. The cross-bar L is provided with a spring-bolt, $l'$, the forward end of which rests against the side of the angular rod K, and enters a notch in the said rod at its angle, to hold the various parts in place while the machine is being lifted from the hill, that the shovels may not come together before they are drawn from the ground, (as they would be by the weight of machine,) and thus take up the seed or plant planted.

To the under side of the end parts of the cross-bar L are attached the upper ends of two bars, M, which pass down through keepers attached to the outer sides of the upper parts of bars D, enter the slots formed in the lower parts of said bars D, so as, when the cross-bar L is pushed down, to strike the upper ends of the curved bars N and push them downward. The bars N pass through slots in the lower ends of the bars D, have plates or shovels O attached to their lower ends, and are so curved that when they are pushed downward the shovels O may move inward and push the soil over the seed to cover it. The upper parts of the curved bars N, that pass through the slots in the bars D, are kept in place by cross-pins, and to their ends are attached the lower ends of two spiral springs, P, the upper ends of which are attached to the cross-bar E.

With this construction, as the cross-bar L and bars M are drawn upward, the springs P draw the curved bars N upward, and thus with-draw the shovels O. With this construction, as the machine is raised from the ground, the operator draws back the bolt l', which allows the bars D to slide down through the cross-bar L, carrying the rod F with them. The movement of the angular rod K, through the cross-bar L, causes the shovel G to move forward against the shovel H, so that they can readily enter the ground, pushing the slide I forward in the box B. As the shovels enter the ground, downward pressure upon the cross-bar L forces the said cross-bar L down upon the bars D. The downward movement of the cross-bar L upon the angular rod K moves the shovel G back to open a hole to receive the seed and draws the slide I back, dropping the seed. As the cross-bar L continues to move downward, the lower ends of the bars M come in contact with the upper ends of the curved bars N, forcing them downward, and forcing the shovels O inward to cover the seed, and so on, the operator being able to plant the seed almost as fast as he can walk.

To adjust the machine for use as a seed-planter, the hopper J, the dropping-slide I, and the box B are detached. The plate Q is secured to the front bar of the plate A by the bolts C. To the plate Q is attached a pin, R, which projects upward and forward, and is designed to receive an eye, s', attached to the lower forward part of the plant-hopper S. The lower rear part of the plant-hopper S has an eye formed in or attached to it to receive the hooks g'. The sides of the parts of the hopper S overlap each other, and are pivoted to each other at their upper corners, so that their lower ends may be drawn apart to allow the plant to drop into the hole opened by the rearward movement of the shovel G, and closed to receive another plant. The hopper S is opened and closed, the shovel G is moved back and forward, and the plates O are moved down and up by the movement of the cross-bar L, as hereinbefore described.

Having thus described my invention, I claim as new and desire to secure by Letters Patent—

The combination of the box and bolts B C, the hopper J, and the dropping-slide I with the base-plate A, the oscillating rod F, and the operating mechanism of the machine, substantially as herein shown and described.

JOSHUA CORNELIUS TERRILL.

Witnesses:
R. S. ELLIS,
JNO. C. FREDERICK.